(12) United States Patent
Bao et al.

(10) Patent No.: US 8,923,114 B2
(45) Date of Patent: Dec. 30, 2014

(54) START-UP DELAY FOR EVENT-DRIVEN VIRTUAL LINK AGGREGATION

(71) Applicant: International Business Machines Corporation, Armonk, NY (US)

(72) Inventors: Lei Bao, Wuxi (CN); Gangadhar Hariharan, Santa Clara, CA (US); Tamanna Z. Sait, San Jose, CA (US); Venkatesan Selvaraj, Sunnyvale, CA (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 14/072,345

(22) Filed: Nov. 5, 2013

(65) Prior Publication Data

US 2014/0192636 A1 Jul. 10, 2014

Related U.S. Application Data

(63) Continuation of application No. 13/734,654, filed on Jan. 4, 2013.

(51) Int. Cl.
*G01R 31/08* (2006.01)
*H04L 12/24* (2006.01)
*H04L 12/709* (2013.01)

(52) U.S. Cl.
CPC .......... *H04L 41/0654* (2013.01); *H04L 45/245* (2013.01)
USPC .......................................... 370/225; 370/220

(58) Field of Classification Search
None
See application file for complete search history.

(56) References Cited

U.S. PATENT DOCUMENTS

| 7,672,227 | B2 * | 3/2010 | Santoso et al. ................ 370/217 |
| 8,209,420 | B2 * | 6/2012 | Moonen ........................ 709/227 |
| 8,213,296 | B2 | 7/2012 | Shannon et al. |
| 8,499,060 | B2 * | 7/2013 | Narayanan et al. ........... 709/220 |
| 8,634,417 | B2 * | 1/2014 | Assarpour ..................... 370/389 |
| 2008/0285555 | A1 * | 11/2008 | Ogasahara .................... 370/389 |
| 2009/0279564 | A1 * | 11/2009 | Li ................................. 370/433 |
| 2011/0292787 | A1 * | 12/2011 | Kotrla et al. .................. 370/216 |
| 2013/0215896 | A1 * | 8/2013 | Beecroft et al. .............. 370/392 |
| 2013/0243008 | A1 | 9/2013 | Singla et al. |
| 2013/0259047 | A1 | 10/2013 | Bhagavathiperumal et al. |
| 2013/0262651 | A1 | 10/2013 | Shah et al. |
| 2014/0192632 | A1 | 7/2014 | Sait et al. |
| 2014/0192635 | A1 * | 7/2014 | Bao et al. ...................... 370/225 |
| 2014/0192636 | A1 * | 7/2014 | Bao et al. ...................... 370/225 |
| 2014/0192817 | A1 * | 7/2014 | Sait et al. ...................... 370/400 |
| 2014/0195694 | A1 | 7/2014 | Sait et al. |
| 2014/0198793 | A1 | 7/2014 | Allu et al. |

(Continued)

OTHER PUBLICATIONS

U.S. Non-Final Office Action for U.S. Appl. No. 13/734,654 mailed Aug. 5, 2014.

*Primary Examiner* — Robert Wilson

(57) ABSTRACT

Embodiments of the invention relate to virtual link aggregation. One embodiment includes preventing network traffic loss upon rebooting of a first networking device based on: maintaining a first group of networking ports in a first disabled state, determining a link-status of a first link between the first networking device and a second networking device, activating a delay timer for delaying the rebooting of the first network device upon the determination of a first status indication for the first link, and switching at least one of the first group of networking ports to a first enabled state upon expiration of the delay timer.

9 Claims, 6 Drawing Sheets

(56) References Cited

U.S. PATENT DOCUMENTS

| | | |
|---|---|---|
| 2014/0204732 A1 | 7/2014 | Arumugam et al. |
| 2014/0211663 A1* | 7/2014 | Lei et al. .................. 370/256 |
| 2014/0215084 A1* | 7/2014 | Lei et al. .................. 709/230 |
| 2014/0269418 A1* | 9/2014 | Kaushik et al. ............ 370/254 |
| 2014/0307540 A1* | 10/2014 | Duda et al. ................ 370/220 |

* cited by examiner

START-UP DELAY FOR EVENT-DRIVEN VIRTUAL LINK AGGREGATION

CROSS-REFERENCE TO RELATED APPLICATIONS

This patent application is a continuation patent application of U.S. patent application Ser. No. 13/734,654, filed on Jan. 4, 2013, the disclosure of which is incorporated herein its entirety by reference.

BACKGROUND

The present invention relates to network switches and switching, and more particularly, this invention relates to start-up delay for event-driven virtual link aggregation.

In a data center comprising one or more access switches, each access switch connects two aggregation switches for redundancy. Link aggregation uses available bandwidth across a switch boundary at an aggregation layer.

BRIEF SUMMARY

Embodiments of the invention relate to virtual link aggregation. One embodiment includes preventing network traffic loss upon rebooting of a first networking device based on: maintaining a first group of networking ports in a first disabled state, determining a link-status of a first link between the first networking device and a second networking device, activating a delay timer for delaying the rebooting of the first network device upon the determination of a first status indication for the first link, and switching at least one of the first group of networking ports to a first enabled state upon expiration of the delay timer.

Other aspects and embodiments of the present invention will become apparent from the following detailed description, which, when taken in conjunction with the drawings, illustrate by way of example the principles of the invention.

DETAILED DESCRIPTION

Figure 1:
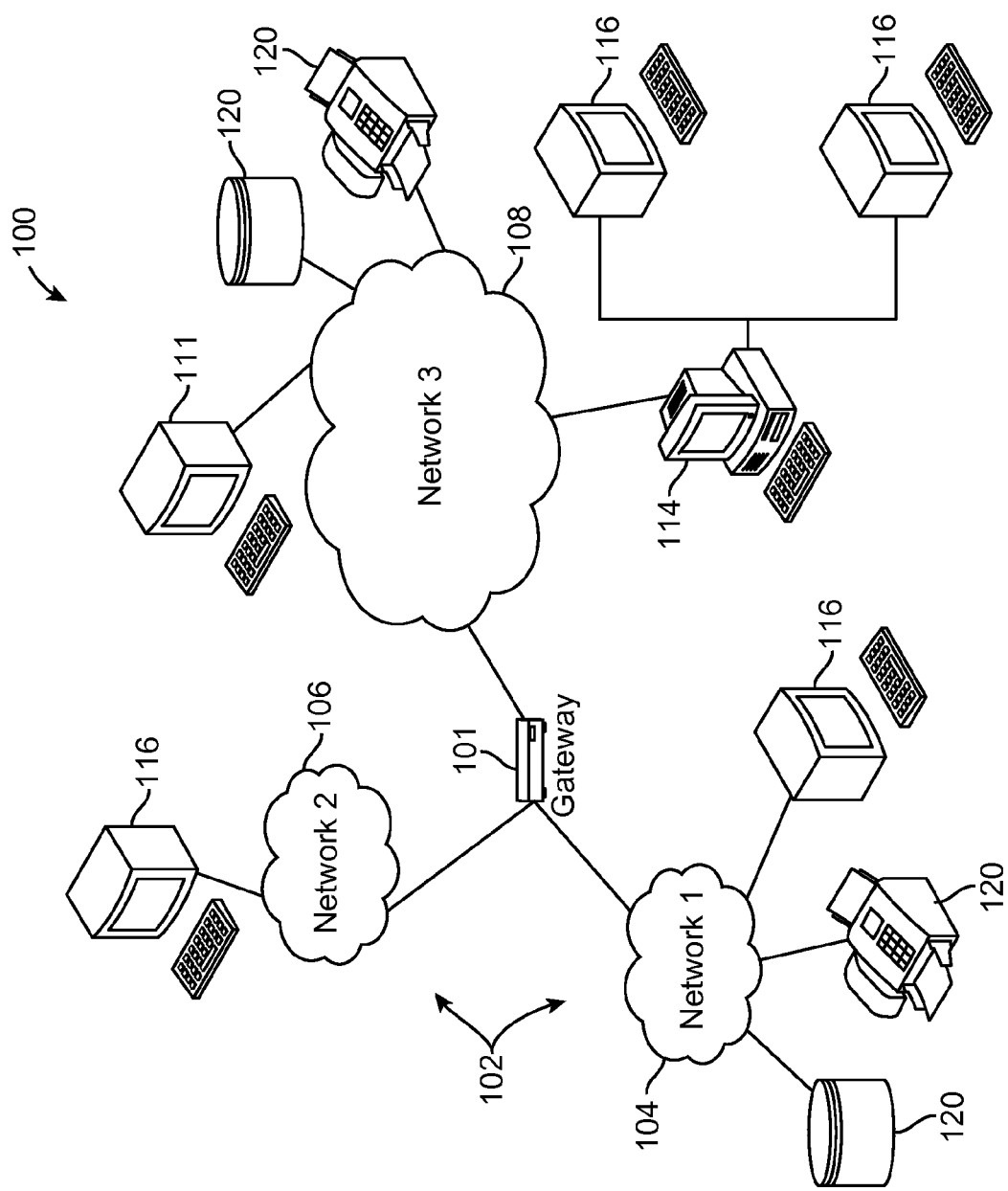
FIG. 1 is a network architecture, in accordance with one embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to the drawings, FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be enhanced through the use of VMWARE software in some embodiments.

In other examples, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, therefore allowing access and distribution of services across many computing systems. Cloud computing typically involves an Internet connection between the systems operating in the cloud, but other techniques of connecting the systems may also be used, as known in the art.

Figure 2:
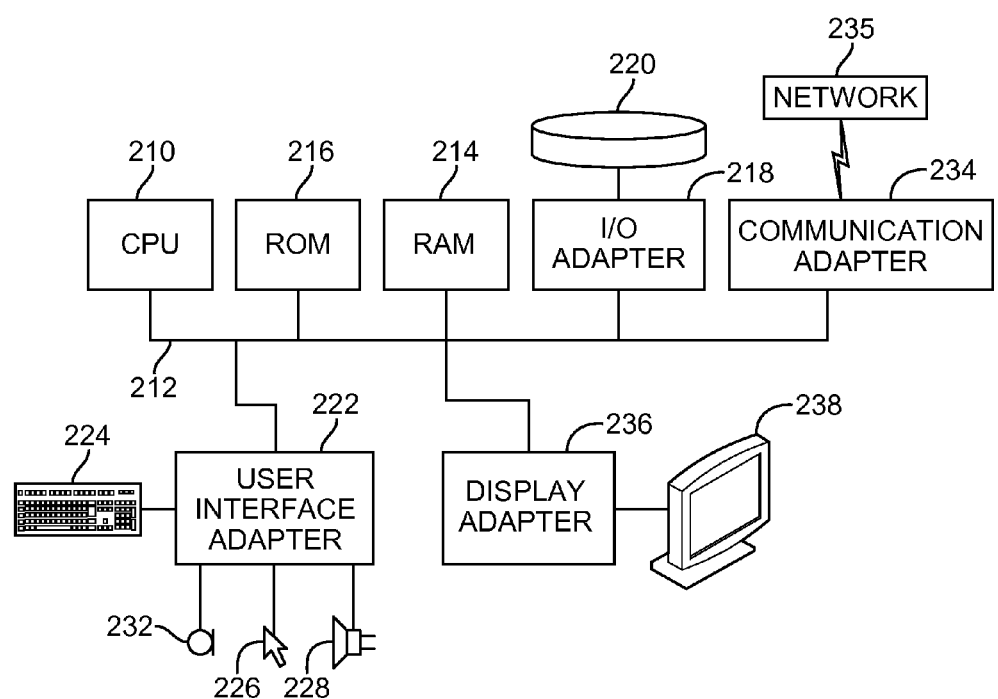
FIG. 2 shows a representative hardware environment that may be associated with the servers and/or clients of FIG. 1, in accordance with one embodiment of the invention.

FIG. 2 shows a representative hardware environment associated with a user device 116 and/or server 114 of FIG. 1, in accordance with one embodiment. In one example, a hardware configuration includes a workstation having a central processing unit 210, such as a microprocessor, and a number of other units interconnected via a system bus 212. The workstation shown in FIG. 2 may include a Random Access Memory (RAM) 214, Read Only Memory (ROM) 216, an I/O adapter 218 for connecting peripheral devices, such as disk storage units 220 to the bus 212, a user interface adapter 222 for connecting a keyboard 224, a mouse 226, a speaker 228, a microphone 232, and/or other user interface devices, such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

In one example, the workstation may have resident thereon an operating system, such as the MICROSOFT WINDOWS Operating System (OS), a MAC OS, a UNIX OS, etc. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 3:
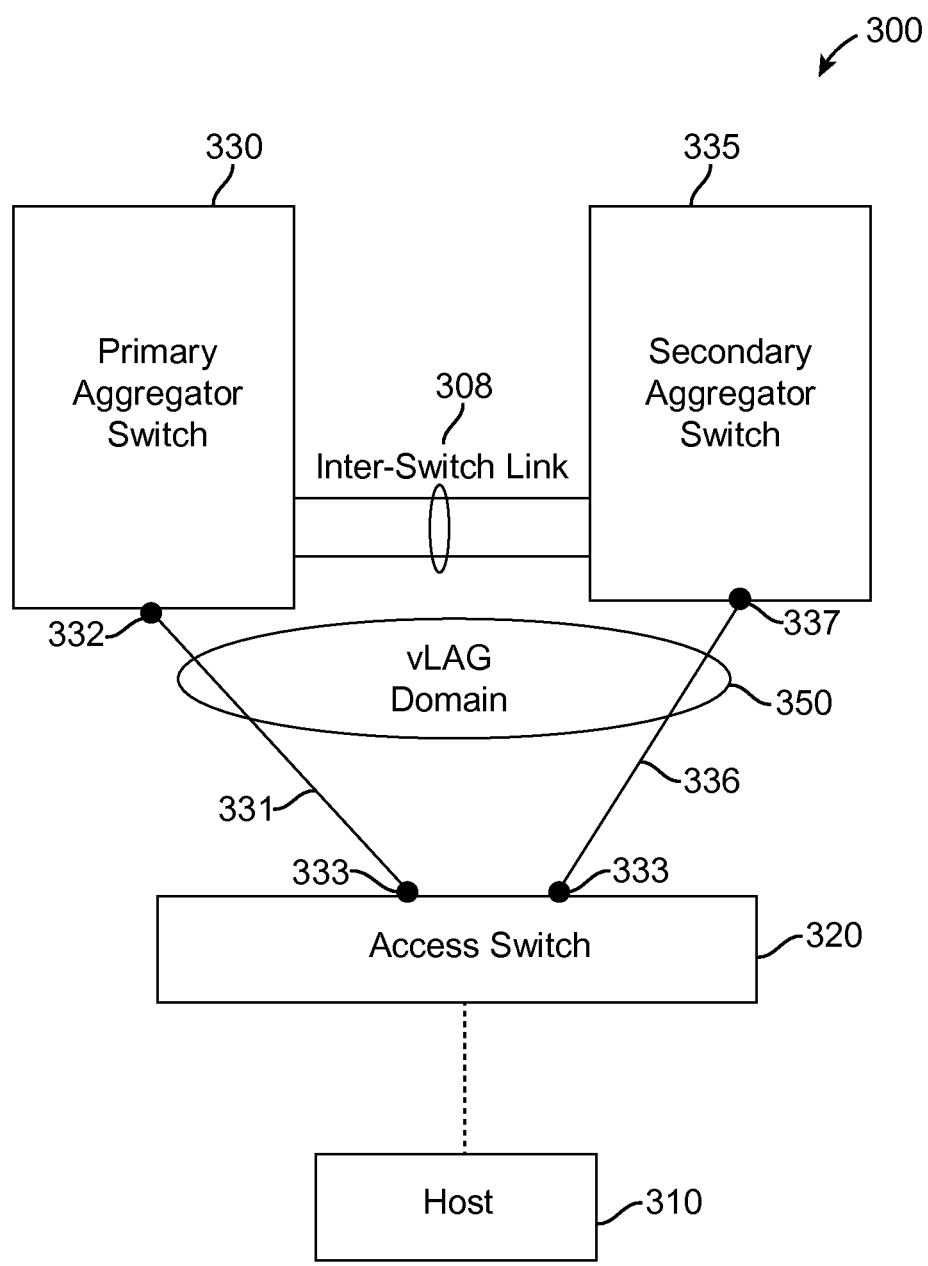
FIG. 3 is a diagram of an example data center system, in which an embodiment of the invention may be implemented.

FIG. 3 is a diagram of an example data center system 300, in which an embodiment of the invention may be implemented. An access switch 320 is connected to two aggregation switches for redundancy, for example, primary switch 330 and secondary switch 335. The primary aggregator switch 330 includes many network ports 332, the secondary aggregator switch 335 includes many network ports 337, and the access switch includes many network ports 333.

Virtual link aggregation group (vLAG) is a feature that uses all available bandwidth without sacrificing redundancy and connectivity. Link aggregation is extended by vLAG across the switch boundary at the aggregation layer. Therefore, an access switch 320 has all uplinks in a LAG, while the aggregation switches 330, 335 cooperate with each other to maintain this vLAG. The vLAG domain 350 comprises virtual links to the primary aggregator switch 330 and the secondary aggregator switch 335 that may comprise, for example, combinations of physical links 331 and 336 to establish virtual links.

Since vLAG is an extension to standard link aggregation, layer 2 and layer 3 features may be supported on top of vLAG. In the system 300 shown in FIG. 3, both primary aggregator switch 330 and secondary aggregator switch 335 are connected with an inter-switch link (ISL) 308. When the host 310 (e.g., an Internet Protocol (IP) multicast receiver) connected to the access switch 320 sends network traffic (e.g., via a packet), the packet is forwarded to one of the aggregator switches (either primary 330 or secondary 335).

In system 300, when either of the primary aggregator switch 330 or the secondary aggregator switch 335 is starting up/rebooting, vLAG networking traffic suffers traffic bandwidth loss from this delay due to the network traffic improperly flowing to the networking ports of the aggregator switches 330/335.

Figure 4:
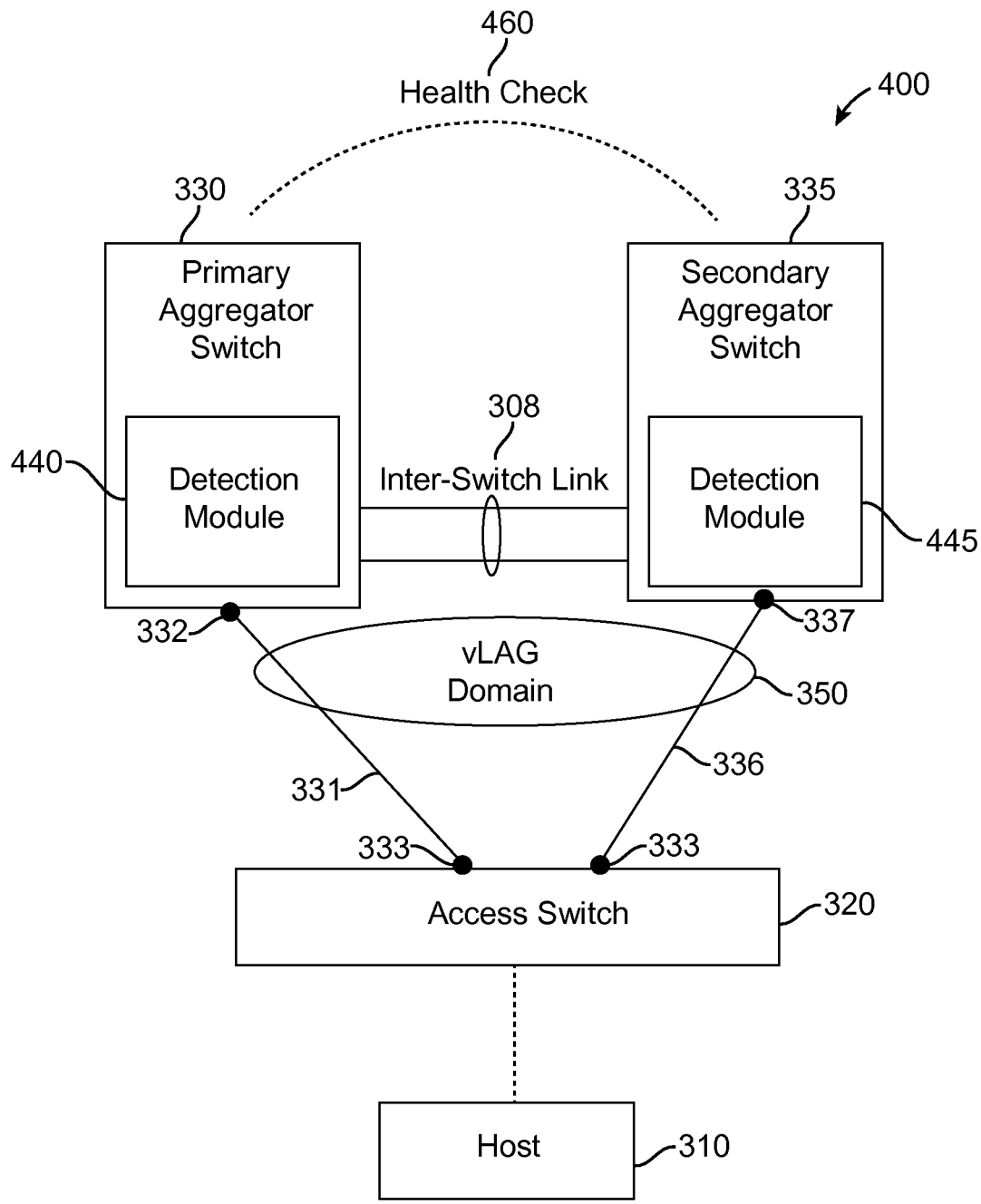
FIG. 4 is a block diagram of a system, according to one embodiment of the invention.

FIG. 4 shows a system 400, such as a data center, according to one embodiment of the invention that avoids network traffic bandwidth loss when the primary aggregator switch 330 or the secondary aggregator switch 335 is starting up/rebooting. In one embodiment, in system 400 the primary aggregator switch 330 includes detection module 440 and the secondary aggregator switch 335 includes detection module 445. In one example, the detection module 440 maintains the networking ports (vLAG ports) of the primary aggregator switch 330, such as networking port 332, in a first disabled state (e.g., ERRDISABLED state) upon startup/reboot until the ISL 308 is enabled, then brings up the networking ports, such as networking ports 332, one by one after a programmable delay time. Similarly, the detection module 445 maintains the networking ports (vLAG ports) of the secondary aggregator switch 335, such as networking port 337, in a first disabled state (e.g., ERRDISABLED state) upon startup/reboot until the ISL 308 is enabled, then brings up the networking ports, such as networking ports 337, one by one after a programmable delay time.

In one embodiment, the detection module 440 determines a link-status of the ISL 308, activates a first event (e.g., a first delay timer) upon the determination of a first status indication for the ISL 308 (e.g., the ISL 308 is enabled/UP), and switches at least one of the networking ports (e.g., networking port 332) to a first enabled state (e.g., enabled/UP) upon detecting that the timer has elapsed. Similarly, the detection module 445 determines a link-status of the ISL 308, activates a first event (e.g., a first programmable delay timer) upon the determination of a first status indication for the ISL 308 (e.g., the ISL 308 is enabled/UP), and switches at least one of the networking ports (e.g., networking port 337) to a first enabled state (e.g., enabled/UP) upon detecting that the timer has elapsed. In one example, the health check 460 message/status provides the primary aggregator switch 330 and the secondary aggregator switch 335 updates on the health status of each other (e.g., responsive/non-responsive, error/fault, etc.).

In one example, the delay value of the time is programmable based on a typical amount of time that a type of aggregator switch is employed as either the primary aggregator switch 330 or the secondary aggregator switch 335 take to startup/reboot (e.g., 5 sec., 10 sec., 30 sec., etc.).

In one example, the first status indication (e.g., enabled/UP) for the ISL 308 determined by either the detection modules 440/445 indicates that the primary aggregator switch 330 is able to communicate with the secondary aggregator switch 335 via the ISL 308. In another example, the link-status may be determined by the detection module 440/445 to be in a first down-state status (e.g., DOWN/disabled) that indicates the primary aggregator switch 330 is not able to communicate to the secondary aggregator switch 335 via the ISL 308.

In one embodiment, the detection modules 440/445 provide the delay timer in order to allow the primary aggregator switch 330 or the secondary aggregator switch 335 to obtain the necessary protocols ready through the ISL 308. Upon the networking ports (e.g., networking ports 332/337) of a vLAG being in an UP/enabled state, all of the networking traffic through the links will correctly flow. In one example, the delay timer provides for the primary aggregator switch 330/335 to obtain any routing protocols (e.g., Border Gateway Protocol (BGP), Open Shortest Path First (OSPF)) ready on the uplinks for traffic forwarding.

In one embodiment, the state of the vLAG networking ports (e.g., networking ports 332/337) may be changed by the detection module 440/445 based on different network operations within system 400. In one example, when one of the vLAG switches (e.g., primary aggregator switch 330 or secondary aggregator switch 335) reboots, and before the ISL 308 is in an UP/enabled state, all of the networking ports of the vLAG (e.g., networking ports 332 or 337) underlying the vLAG switch are placed in a first disabled state (e.g., ERRDISABLED). When the ISL 308 attains an UP status, the startup-delay timer of the detection module 440/445 is started. After the startup-delay timer expires, the vLAG networking ports state is modified to an UP/enabled state, one after another.

In one example, if the vLAG networking ports are shut down in the established configuration, then the vLAG networking ports are out of the control of the startup-delay timer, the vLAG networking ports state are modified to disabled after boot up, and the vLAG networking ports can only become UP by a no shut down request. If the vLAG switch (e.g., primary aggregator switch 330 or secondary aggregator switch 335) is getting rebooted, the detection module 440/445 does not identify the peer switch (either primary aggregator switch 330 or secondary aggregator switch 335), for example, in a scenario when both the primary aggregator switch 330 and secondary aggregator switch 335 reboot, the startup-delay timer will be cancelled and vLAG networking ports are brought up immediately.

Operations on Networking Ports of System 400:

In one scenario, the vLAG networking ports are either operationally or administratively shut down. In one example, the vLAG networking ports states are changed to disabled by the detection module 440/445 based on detecting that the vLAG networking ports are shut down. In one embodiment, the detection module 440/445 starts the delay timer. When the delay timer expires, the ports are maintained in the disabled state. In another example, based on the above example, an operational or administrative request is made that the vLAG networking ports are not shut down (e.g., a no shut down request). In this example, the detection module 440/445 changes the vLAG networking ports states to UP and starts the delay timer. When the delay timer expires, the vLAG networking ports status is unchanged.

In another scenario, a cable of one or more of the vLAG networking ports is removed. In one embodiment, the detection module 440/445 does not change the state of the vLAG networking ports and starts the delay timer. Upon an insertion of a cable on the vLAG networking ports with a delay timer running, the detection module 440/445 maintains the state of the vLAG networking ports in ERRDISABLED state. When the delay timer expires, the vLAG networking ports state are changed to UP if the vLAG networking ports can be linked up.

Operations on Trunk Portion of the System 400:

In one scenario, a new trunk is enabled to a vLAG with delay timer running. In one embodiment, all of the vLAG networking ports (e.g., networking ports 332/337) in the trunk should be DOWN, and the detection module 440/445 changes the state of those ports will be changed to an ERRDISABLED state if the vLAG networking ports in the trunk are not disabled (i.e., shut down). In another scenario, a trunk is disabled from a vLAG with delay timer running. In one embodiment, the vLAG networking ports of the trunk should be linked up if their state is ERRDISABLED, and those vLAG networking ports of the trunk state are changed to UP if they can be linked up, or changed to DOWN if they can not be linked up.

In another scenario, new networking ports (e.g., networking ports 332/337) are added to the vLAG with delay timer running. In one embodiment, the detection module 440/445 changes the vLAG networking ports state to ERRDISABLED if they are not disabled. In one scenario, vLAG networking ports are removed from the vLAG with delay timer running. In one embodiment, the removed vLAG networking ports are linked up if the vLAG networking ports state is not disabled, and those vLAG networking ports state are changed by the detection module 440/445 to UP if they can be linked up, or DOWN if they cannot be linked up.

Operations on ISL 308 and Health Check 460 of the System 400:

For operations on the ISL 308 and Health Check 460, a single-failure scenario refers to the ISL 308 failure and a double-failure scenario refers to the ISL 308 failure and health check 460 failure.

ISL 308 Single-Failure Scenario:

In one embodiment, for the primary aggregator switch 330, the detection module 440 maintains the networking ports 332 status as ERRDISABLED and delay timer is cancelled if running.

ISL 308 is UP after ISL 308 Single-Failure Scenario:

In one embodiment, after a single-failure of the ISL 308, when the ISL 308 is brought to an UP state, there is no change of the networking ports 332 of the primary aggregator switch 330, and for the secondary aggregator switch 335. The detector module 445 brings all of the vLAG networking ports (e.g., networking ports 337) to an UP state, one after the other, starts the start-up delay timer, and upon the delay timer expiring, does not change status on the vLAG networking ports.

ISL 308 and Health Check 460 Double-Failure Scenario:

In one embodiment, for the networking ports 332/337 of primary aggregator switch 330 and the secondary aggregator switch 335, no status changes are made to the vLAG network ports. If the detector module 440/445 has the start-up delay timer running, start-up delay timer is cancelled, the vLAG networking ports that were maintained in the ERRDISABLED state are brought to an UP state, one after another.

The ISL 308 is UP after a Double-Failure Scenario:

In one embodiment, for the networking ports 332/337 of primary aggregator switch 330 and the secondary aggregator switch 335, no status changes are made to the vLAG network ports. The detector module 440/445 starts the start-up delay timer, and upon expiration of the delay timer, the vLAG networking ports that were maintained in the ERRDISABLED state are brought to an UP state, one after another.

Figure 5:
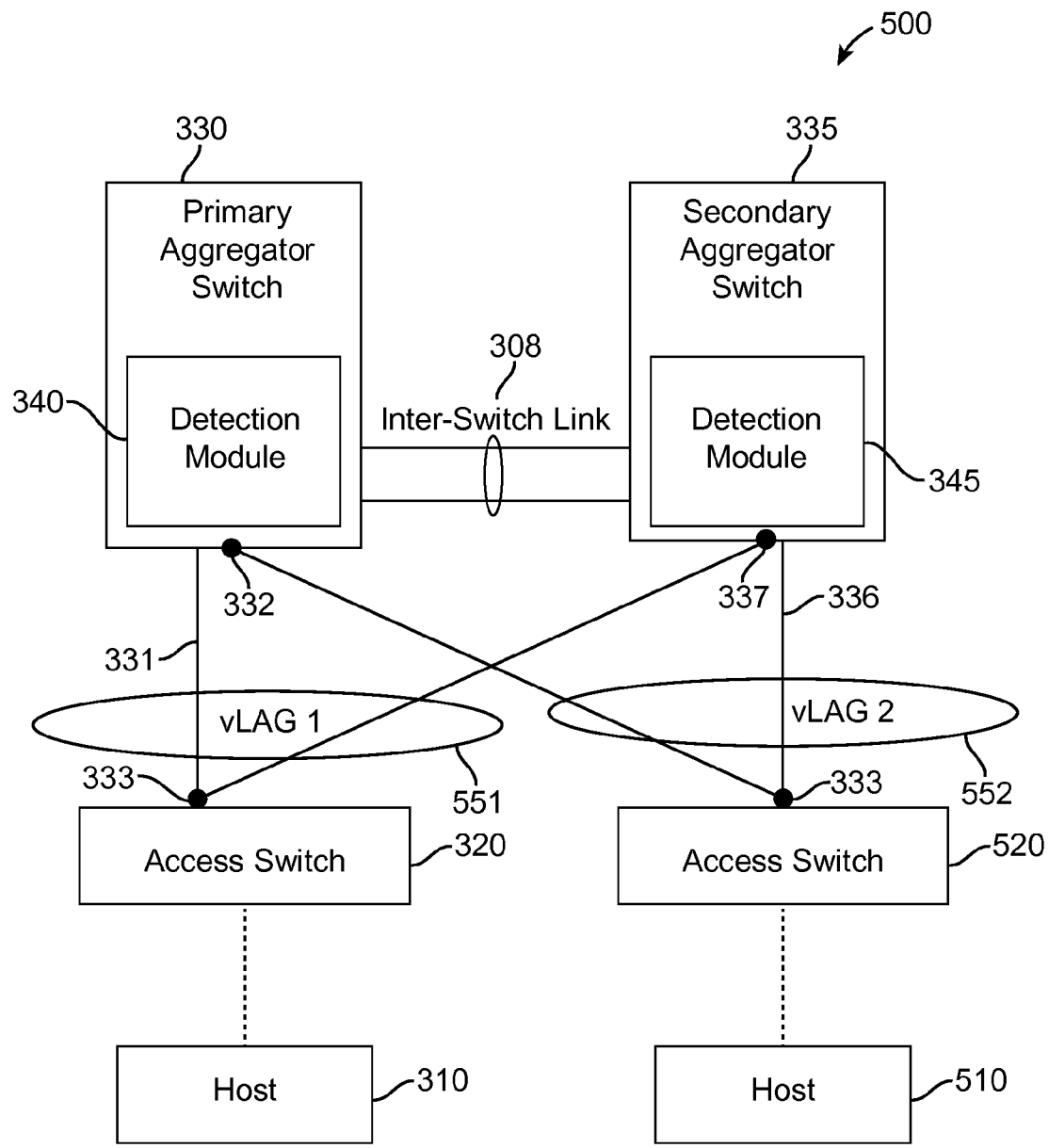
FIG. 5 is a block diagram of another system, according to one embodiment of the invention.

FIG. 5 shows a system 500, such as a data center, according to one embodiment of the invention that avoids network traffic bandwidth loss when the primary aggregator switch 330 or the secondary aggregator switch 335 is starting up/rebooting. In system 500, an additional access switch 520 and host 510 are added to the system 400. In one example, multiple vLAGs are possible, such as vLAG 1 551 and vLAG 2 552. In one embodiment of the invention, the detector modules 440/445 of system 500 operate similarly as in system 400.

Figure 6:
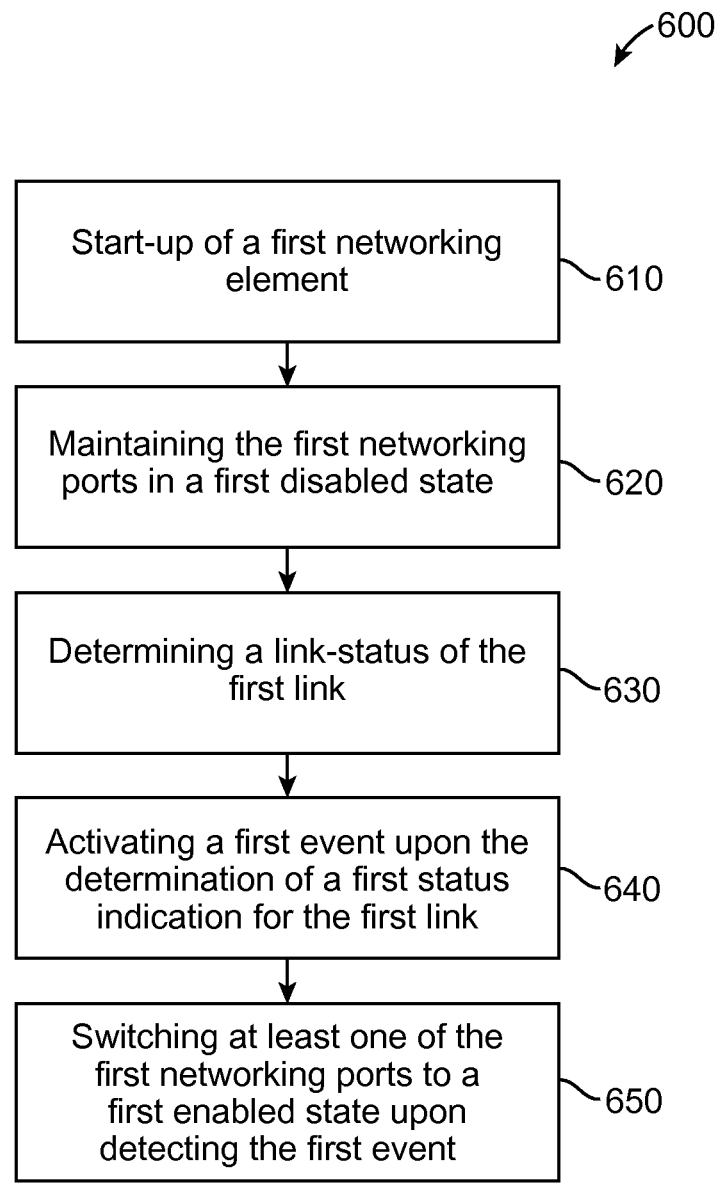
FIG. 6 is a block diagram showing a process for virtual link aggregation, in accordance with an embodiment of the invention.

FIG. 6 shows a block diagram of a process 600 for preventing network traffic loss upon startup of a vLAG switch (e.g., primary aggregator switch 330, secondary aggregator switch 335) according to one embodiment. Process 600 may be performed in accordance with any of the environments depicted in FIGS. 1-5, among others, in various embodiments. Each of the blocks 610-650 of process 600 may be performed by any suitable component of the operating environment. In one example, process 600 may be partially or entirely performed by an aggregator switch (e.g., primary aggregator switch 330, secondary aggregator switch 335), a detection module (e.g., detection module 440/445), etc.

As shown in FIG. 6, in process block 610, a first networking device is started up, booted/rebooted, such as a vLAG switch (e.g., primary aggregator switch 330, secondary aggregator switch 335). In process block 620, a first number of networking ports of a vLAG is maintained in a first disabled state (e.g., ERRDISABLED), for example, by a detection module of an aggregator switch (e.g., detection module 440/445). In one embodiment, in processing block 630, a link-status of a first link (e.g., ISL 308) between the first networking device and a second networking device (e.g., secondary aggregator switch 335).

In processing block 640, a first event (e.g., a delay timer) for delaying the startup of the first network device is activated upon the determination of a first status indication (e.g., an UP state) for the first link (e.g., ISL 308). In process block 650, a STATE of at least one of the first number of networking ports is switched to a first enabled state (e.g., UP) upon expiration of the delay timer.

In one example, process 600 may further include switching at least one of the first number of networking ports to a disabled state upon detecting a port operation, and upon expiration of a first delay value of the delay timer after detecting the port operation, at least one of the first number of networking ports is maintained in a disabled state. In another example, process 600 may include switching at least one of the first number of networking ports to an ERRDISABLED state upon detecting a first trunk operation and the at least one port was previously in an enabled state, and switching at least one of the first number of networking ports to an UP state or a DOWN state upon detecting a second trunk operation and the at least one port was previously in an ERRDISABLED state.

In another example, process 600 may include maintaining a state of at least one of the first number of networking ports upon detecting a first link failure (e.g., ISL 308 failure), and upon expiration of the first delay value of the delay timer after detecting the first link failure, all of the first number of networking ports in an ERRDISABLED state are changed to an UP/enabled state. A state of at least one of the first number and a second number of networking ports are maintained upon detecting the first link failure and a health-check failure, and upon expiration of the first delay value after detecting the first link failure and the health-check failure, all of the first number and second number of networking ports in an ERRDISABLED state are changed to an UP/enabled state.

According to various embodiments, the process 600 may be performed by a system, computer, or some other device capable of executing commands, logic, etc., as would be understood by one of skill in the art upon reading the present descriptions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for virtual link aggregation comprising:
   preventing network traffic loss upon startup of a first networking device based on:
   maintaining a first plurality of networking ports in a first disabled state;
   determining a link-status of a first link between the first networking device and a second networking device;
   activating a delay timer for delaying the startup of the first network device upon the determination of a first status indication for the first link; and
   switching at least one of the first plurality of networking ports to a first enabled state upon expiration of the delay timer.

2. The method of claim 1, further comprising:
   coupling the first networking element to the second networking element using the first link, wherein the first networking element includes the first plurality of networking ports, and the second networking element includes a second plurality of networking ports.

3. The method of claim 2, wherein the first status indication comprises a first up-state status that indicates the first networking element is able to communicate with the second networking element via the first link.

4. The method of claim 3, wherein the link-status further comprises a first down-state status that indicates the first networking element is not able to communicate to the second networking element via the first link.

5. The method of claim 4, further comprising:
   coupling the first networking element to a third networking element using a second link, wherein the third networking element includes a third plurality of networking ports;
   coupling the second networking element to the third networking element using a third link;
   establishing a first virtual link between the third networking element and each one of the first networking element and the second networking element using the third and second links.

6. The method of claim 1, wherein the activating of the delay timer is based at least in part on a first delay value.

7. The method of claim 5, further comprising:
   switching at least one of the first plurality of networking ports to a disabled state upon detecting a port operation, and upon expiration of the first delay value after detecting the port operation, the at least one of the first plurality of networking ports remains in the disabled state.

8. The method of claim 7, further comprising:
   switching at least one of the first plurality of networking ports to an errdisabled state upon detecting a first trunk operation and the at least one port was previously in an enabled state; and
   switching at least one of the first plurality of networking ports to an up state or a down state upon detecting a second trunk operation and the at least one port was previously in an errdisabled state.

9. The method of claim 8, further comprising:
   maintaining a state of at least one of the first plurality of networking ports upon detecting a first link failure, and upon expiration of the first delay value after detecting the first link failure, all of the first plurality of networking ports in an errdisabled state change to an enabled state; and
   maintaining a state of at least one of the first plurality and the second plurality of networking ports upon detecting the first link failure and a health-check failure, and upon expiration of the first delay value after detecting the first link failure and the health-check failure, all of the first plurality and second plurality of networking ports in an errdisabled state change to an enabled state.

* * * * *